Dec. 23, 1969   J. M. BRINKERHOFF ET AL   3,486,025
APPARATUS FOR ANALYZING THE ENERGY DISTRIBUTION OF
A RADIOISOTOPE IN THE PRESENCE
OF INTERFERING RADIATION
Filed Sept. 15, 1966

INVENTORS.
JORIS M. BRINKERHOFF
and ROBERT G. BURTON

BY

ATTORNEY.

United States Patent Office 3,486,025
Patented Dec. 23, 1969

3,486,025
APPARATUS FOR ANALYZING THE ENERGY DISTRIBUTION OF A RADIOISOTOPE IN THE PRESENCE OF INTERFERING RADIATION
Joris M. Brinkerhoff and Robert G. Burton, Arlington, Mass., assignors to LFE Corporation, Boston, Mass., a corporation of Delaware
Filed Sept. 15, 1966, Ser. No. 579,642
Int. Cl. H01j 39/00; G01t 1/16
U.S. Cl. 250—83.3     4 Claims

ABSTRACT OF THE DISCLOSURE

Apparatus for the analysis of the energy distribution of a radioisotope in the presence of interference from other radiation sources. A first pulse amplitude range is defined corresponding to a predetermined energy level and a second range is defined which symmetrically spans the first range and which is approximately twice the magnitude of the first range. Means are provided for selecting pulses of amplitudes within the first range and for selecting pulses of amplitudes within the second range but not within the first range, such that the difference between the selected pulses is an indication of the abundance of a particular isotopic radiation.

---

This invention relates to the detection and analysis of ionizing radiation, particularly the energy distribution of the radiation.

To analyze the energy distribution being radiated by a source of ionizing radiation, such as a radioisotope, it is common practice to employ a radiation detector which produces electrical pulses having an amplitude distribution which is representative of the unknown energy spectrum. Scintillation detectors, for example, may be arranged to operate in this way and also appropriate circuitry may be provided to sort out the pulses according to their relative amplitudes. As is well known to those skilled in the art, these operations are performed in a pulse height analyzer, which is an instrument specifically designed for the purpose of analyzing the distribution of energy from radioisotopes and other sources of ionizing radiation both naturally occurring and artificially induced.

While the energy at which a peak occurs in the energy spectrum of a radioactive source basically serves to identify a radioisotope which is present, in a pulse height analyzer, the relative number of pulses actually produced with an amplitude corresponding to this peak does not necessarily provide an accurate indication of the relative abundance of the isotope. The reason for this is that in addition to the pulses or counts produced by the isotope in question, there may be other counts of similar amplitude produced by other isotopes due to incomplete absorption of energy by the detector. In other words, the "background" present under the peak of a given isotope is of a magnitude which is dependent on the abundance of other isotopes, the peaks of which may be similarly superimposed on backgrounds which are in turn dependent on the amounts of still other isotopes that may be present. What this means, in general, is that some technique must be employed to determine how many of which counts are due to which isotope.

To illustrate this mathematically, suppose there is an isotope A which produces $a_1$ counts in amplitude range 1, $a_2$ counts in amplitude range 2, etc. Similarly, let isotope B produce counts $b_1$, $b_2$, etc., in these same amplitude ranges, isotope C producing $c_1$, $c_2$, etc. Then if there is $x$ amount of isotope A, $y$ amount of isotope B, and $z$ amount of isotope C, the total counts, $R_1$, in amplitude range 1 from all three isotopes will be:

$$a_1x + b_1y + c_1z = R_1$$

and if amplitude range 2 contains $R_2$ counts, we have the relation $$a_2x + b_2y + c_2z = R_2$$

and similarly $$a_3x + b_3y + c_3z = R_3$$
$$a_4x + b_4y + c_4z = R_4$$
$$a_5x + b_5y + c_5z = R_5$$

etc.

A classic method of solution of such a set of equations is the so-called "least square" method, which yields a set of values $x_0$, $y_0$, $z_0$, such that the sum of the squared differences $$(a_1x_0 + b_1y_0 + c_1z_0 - R_1)^2$$

is a minimum.

While the above method is satisfactory from a mathematical standpoint, practically speaking, it has significant drawbacks. If there is an isotope in the source whose presence was not recognized and hence not taken into account in the equations, serious errors can be introduced. Also if certain isotopes are assumed to be present which in fact are not present, the accuracy of the answer obtained for those which are present is greatly impaired. In other words, greater precision could have been obtained if the equations had been solved only for those isotopes which were actually present. Finally, the statistical accuracy of $R_1$ may not be sufficient to yield significant results for all of the unknowns, $x_0$, $y_0$, $z_0$, etc. If there are a large number of unknowns, the answers obtained for these may actually be more a reflection of chance statistical fluctuation in the data than that of the true energy distribution.

Another simpler, though less precise, method of solution is simply to add together certain groups of the above equations, each group being representative of a particular spectral peak, the number of groups being equal to the number of unknowns, and the remainder of the equations (i.e., those not representative of characteristic peaks) being ignored altogether. In fact, it is usually possible, in effect, to solve such a set of equations by simply taking advantage of the fact that the peak of highest energy has virtually no interference from peaks of lower energy. Thus, the spectrum is successively "stripped" from right to left by first calculating the rightmost peak, subtracting its interference from left-lying peaks, repeating with the next peak, and so forth. This method offers the advantage that certain peaks whose presence was previously unrecognized may become evident as the interferences from the other peaks are subtracted out. Nonetheless, such peaks could still go unrecognized, and failure to account for their interference with the observed peaks can introduce substantial inaccuracies.

In accordance with the present invention it is assumed that the summation of all interferences with any given peak, over the width of the peak, all linear in character. The "signal plus background" is taken as the sum of the counts in an amplitude range bracketing the width of the peak, and the "background," which is then subtracted, is taken as the sum of the counts in two sets of ranges lying on either side and immediately adjacent to the peak of interest. A major advantage of this method, of course, is that it does not require any "a priori" assumption as to which isotopes may be present.

It is therefore an object of the present invention to provide relatively simple but effective means to determine the energy distribution of ionizing radiation.

It is another object of the present invention to provide means for the objective recognition of single energy peaks within an observed spectrum of ionizing radiation without regard to the presence of other peaks.

It is still another object of the present invention to provide means for the quantitative measurement of the amplitudes of single energy peaks within an observed spectrum of ionizing radiation, without reference to the amplitudes of any other energy peaks that may be present.

The novel features of the invention together with further objects and advantages will become apparent from the following detailed description of preferred embodiments and from the drawing to which the description refers. In the drawing.

Figure 1:
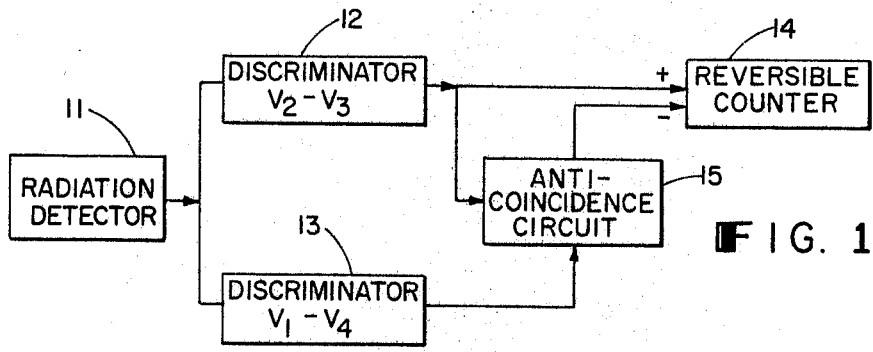
FIG. 1 is a block diagram of a basic embodiment of the invention.

With reference now to the drawings and more particularly to FIG. 1, it will be observed that the numeral 11 designates an ionizing radiation detector such as a scintillation detector which produces electrical pulses whose amplitude distribution is dependent upon the energy distribution of the radiation, and whose rate of occurrence is dependent upon the rate of occurrence of the ionizing events produced by the radiation. The output side of the detector is coupled to a pair of pulse height analyzing circuits or discrimiantors 12 and 13, the former of which is adapted to transmit only those pulses exhibiting amplitudes in the ranges $V_2$ to $V_3$, and the latter of which transmits only those pulses exhibiting amplitudes in the range $V_1$–$V_4$. The midpoint of the range $V_2$, $V_3$ is selected to correspond to a particular energy level of interest, and since this lever may have different values depending upon the type of analysis which is being carried out, it follows that, generally speaking, the location of the range or "window" relative to the overall spectrum of amplitudes produced will be readily adjustable. In accordance with the invention, the magnitude of the range $V_2$, $V_3$ is selected to correspond to the width of an energy peak within the spectrum, by way of example, equal to the full width of a peak between its points of half maximum value. Discriminator 13 is adapted to operate much like discriminator 12 except with regard to the nature of the range of amplitudes $V_1$–$V_2$ to which it selectively responds. Although range $V_1$–$V_4$ is arranged to have the same midpoint as the range $V_2$, $V_3$, the magnitude of range $V_1$–$V_4$ is established so that $V_1$–$V_4$ is approximately twice that of $V_2$, $V_3$.

Finally, the output side of discriminator 12 is coupled to the positive increment input of a forward-backward counter 14 and also to one of the inputs of an anticoincident circuit 15. The other input to anticoincident circuit 15 is obtained from the output side of discriminator 13, and the output side of the anticoincidence circuit itself is coupled to the negative increment input of counter 14.

In operation, pulses having amplitudes in the range $V_2$, $V_3$ cause the counter 14 to advance in the positive direction, that is to count up, while under certain conditions pulses having amplitudes in the range $V_1$–$V_4$ cause the counter to count down. These conditions, as is readily apparent from the drawing, are that the amplitudes of the pulses within $V_1$, $V_4$ must not also fall within the range $V_2$, $V_3$, for in this case, only the positive increment input is fed pulses or counts by way of discriminator 12.

Figure 2:
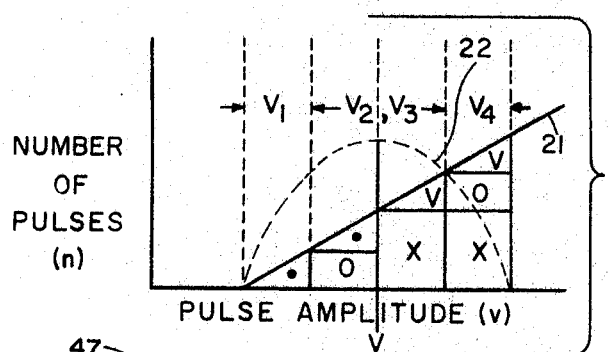
FIG. 2 is a graph illustrating the principle of operation of the embodiment of FIG. 1.

The effect of this pulse counting arrangement is illustrated in FIG. 2. In FIG. 2 the solid straight line 21 is intended to represent a portion of the amplitude spectrum of pulses which are produced by a source having an energy level different from that which corresponds to amplitude V defining the midpoint of the ranges $V_2$, $V_3$ and $V_1$–$V_4$. That is to say, in the region $V_1$–$V_4$, the spectrum produced by this source is antisymmetric and linear. Consequently, the number of pulses $N_2$ produced during a given period of time in the range $V_2$ will be $\Delta N$ more than the number of pulses $N_1$ produced in the range $V_1$, where $\Delta N$ is a constant determined by the slope of the line 21. Similarly, $N_3$ pulses produced in the range $V_3$ will number $2\Delta N$ more than $N_1$, and $N_4$ pulses produced in the range $V_4$ will number $3\Delta N$ more than $N_1$. Now if the number of pulses in the ranges $V_1$ and $V_4$, are subtracted from the number of pulses in the ranges $V_2$, $V_3$, which is what actually happens due to the arrangement of the anticoincidence circuit and counter of FIG. 1, then the net count will be zero or in other words, the source will have no effect on the total pulse count. This is illustrated graphically in FIG. 2, where symbols of like character are intended to designate specific areas beneath the line 21, representing population of counts which effectively nullify one another as between the ranges $V_1$, $V_4$ on the one hand, and $V_2$, $V_3$ on the other. Conversely, if the source has an energy level which gives rise to an amplitude peak 22 which is symmetric about the midpoint V of $V_2$, $V_3$ and $V_1$–$V_4$, then the counts in the outer ranges $V_1$ and $V_4$ do not offset the counts in the inner ranges $V_2$, $V_3$ and, so the net count can in this case be taken to fairly represent the abundance of a particular isotope whose energy level corresponds to amplitude V.

Figure 3:
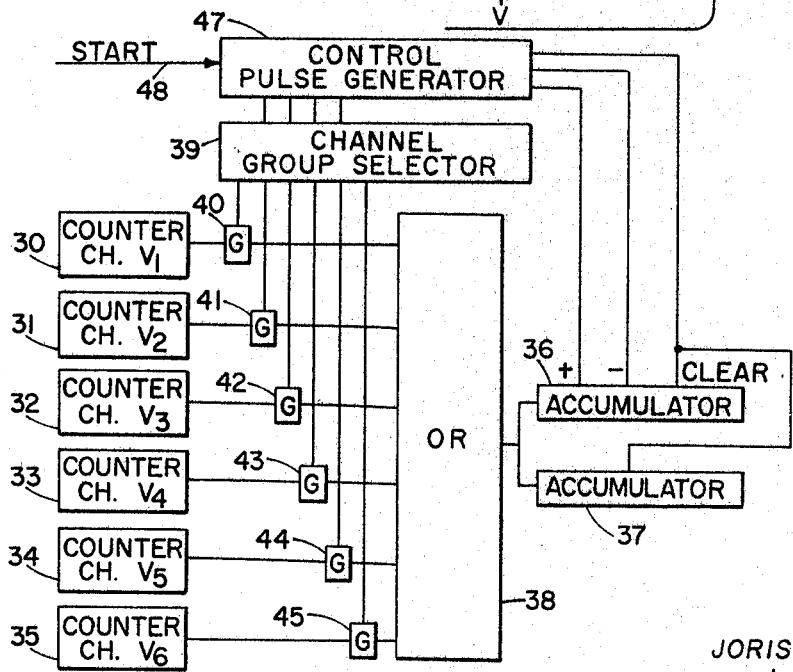
FIG. 3 is a block diagram of a more elaborate embodiment of the invention.

FIG. 3 illustrates an application of this same concept to a multichannel pulse height analyzer wherein counts are produced in each of a plurality of amplitude ranges or channels representing a continuum of energy ranges defining an energy spectrum. In FIG. 3, the numerals 30–35 designate the counters wherein the pulse outputs of the various channels are counted. Although many more such channels are generally provided in this type of instrument, only six channels have been illustrated for purposes of clarity in the drawing. This number will readily suffice to explain the principle involved.

Thus, the outputs of counters 30–35 are selectively coupled to a pair of accumulators 36 and 37 by way of selection gates 40–45 and a logical OR circuit 38 which, in effect, serves as a buffer between the counters and the accumulators. Gates 40–45, in turn, are conditioned, in a preselected sequence by a channel group selector 39 which is supplied with gate conditioning pulses from a control pulse generator 47.

For purposes of simplifying the explanation of the operation of the system of FIG. 3, let it be assumed that the channel designations $V_1$–$V_4$ refer to the same ranges of pulse amplitudes as were dealt with in connection with FIGS. 1 and 2. Now it is seen that individual counts of the number of pulses in each range are made available by counters 30–33 so that the operation, in accordance with FIG. 3, entails the processing of count totals rather than individual counts as was the case with the embodiment of FIG. 1. To process the counts which have been accumulated after a predetermined period of time in channels $V_1$–$V_4$, for example, channel selector 39 is set to control gates 40–43, and a start signal is applied to pulse generator 47. In consequence, a control pulse is supplied to the negative sense input of accumulator 36 to cause the accumulator to subtract and then a control pulse is supplied to gate 40, conditioning the gate to pass the number standing in counter 30 to the input of both accumulators 36 and 37. A parallel transfer of binary digit signals representing the number will ordinarily be used for accomplishing this result and so it will be understood that gate 40 and its associated input and output lines are symbolic of all of the paths leading from each individual output counter stage to a corresponding input stage of the accumulator.

After this first number representing the count in counter 30 has been entered, another control pulse is passed to gate 43 which effectively inserts into the accumulators the number representing the count in counter 33. Next, the positive sense input of the accumulator 36 is supplied with a control pulse to cause the accumulator to add, and then the number of counts standing in counters 31 and 32 are entered into the accumulators. Appropriate gate control pulses are likewise supplied by pulse generator 47 for this purpose. The result is that accumulator 36 derives a number which is equal to $(N_2+N_3)-(N_1+N_4)$ where $N_1$, $N_2$, $N_3$, $N_4$ represent the respective counts in the individual counters 30–33 and this is the same number which is derived on a count-at-a-time basis with the arrangement of FIG. 1. Contrariwise, the number derived by accumulator 37 is equal to $N_1+N_2+N_3+N_4$, whose square-root may be used either to establish the error associated with the determination of peak height, or else to provide an objective means for determination of the likelihood that a mere statistical fluctuation in the data would have occurred of magnitude equal to the suspected "peak." Although for simplicity, no counterpart to accumulator 37 was illustrated in FIG. 1, it is apparent that the same could also be readily incorporated in that arrangement. Finally, a "clear" pulse is produced by pulse generator 47 to prepare the system for the processing of another set of channels. These may be manually selected, or if all the channels are to be processed in regular sequence, then channel selector 39 may be arranged to advance automatically upon the occurrence of the clear pulse so that channels $V_2$–$V_5$ are selected next. Then follows the same treatment of the counts $N_2$–$N_5$ in these channels as in the case of channels $V_1$–$V_4$ and so forth.

Although the invention has been described in terms of two preferred embodiments, it will be apparent to those skilled in the art that other embodiments and modifications are possible without departing from the spirit and scope of the invention. For example, rather than processing a group of four amplitude ranges or channels at a time, the number may be doubled or tripled, etc., just so long as the same number of channels are combined in a positive sense as in the negative. In terms of ratios, this means that instead of the 1:2:1 arrangement described, 2:4:2, 3:6:3, etc., might also be used. Also, in the embodiment of FIG. 1, the anticoincidence circuit can be eliminated and yet the same result obtained if discriminator 13 is arranged to transmit only one half the number of pulses that it normally would. This can readily be accomplished with a simple change in the discriminator output to provide a scale of a two dividing function. The identity of this arrangement with that of FIG. 1 as shown, derives from the fact that $(N_2+N_3)-(N_1+N_4)$ will differ from $(N_2+N_3)-\frac{1}{2}(N_1+N_2+N_3+N_4)$ only by a proportionality constant. Therefore the invention should not be deemed to be limited to the details of the embodiments described herein but rather it should be deemed to be limited only by the scope of the appended claims.

What is claimed is:

1. Apparatus for the analysis of the energy distribution of ionizing radiation comprising: means to produce electrical pulses whose amplitude distribution is dependent upon said energy distribution and whose rate of occurrence is dependent upon the rate of occurrence of ionizing event produced by said radiation; means to select pulses having amplitudes within a first range; means to select pulses having amplitudes within second and third ranges adjacent the upper an lower limits, respectively, of said first range; said second and third ranges each having a magnitude which is approximately one-half that of said first range; and, means to produce indications of the difference between the number of pulses occurring in said first range and the number of pulses occurring in said second and third ranges.

2. Apparatus for the analysis of the energy distribution of ionizing radiation comprising: means to produce electrical pulses whose amplitude distribution is dependent upon said energy distribution and whose rate of occurrence is dependent upon the rate of occurrence of ionizing event produced by said radiation; means to select pulses having amplitudes within a first range; means to select pulses having amplitudes within a second range spanning said range and having its midpoint coincident with that of said first range, said second range having a magnitude which is approximately twice that of said first range; means to select pulses from said second range having amplitudes within said second range but outside of said first range; and, means to produce indications of the difference between the number of pulses occurring in said first range and the number of pulses selected from said second range.

3. Apparatus according to claim 2 wherein said means to select pulses from said second range having amplitudes within said second range but outside of said first range includes an anticoincidence circuit operative to provide a first output when pulses of amplitude within both said first and second ranges are applied thereto, and to provide a second output when pulses of amplitudes within said second range but outside of said first range are applied thereto, and said indication producing means is a reversible counter operative to count positively when said anticoincidence circuit produces said second output, and to count negatively when said anticoincidence circuit produces said first output, thereby to indicate the abundance of a predetermined energy peak without interference from other energy peaks.

4. In a multi-channel analyzer for the analysis of the energy distribution of ionizing radiation wherein counts of pulses are produced in the output of each of a plurality of channels representative of a continuum of energy ranges defining an energy spectrum, the combination with said analyzer of means to combine the outputs of N adjacent channels, where N is a pre-selected even number; means to combine the outputs of one-half N adjacent channels; and, means to produce indications of the difference between the number of pulses in the outputs of each of said first mentioned combination of channels and the number of pulses in the outputs of each of said second mentioned combination of channels adjacent the upper and lower limits of said first mentioned combination of channels.

References Cited

UNITED STATES PATENTS

| | | | |
|---|---|---|---|
| 3,114,835 | 12/1963 | Packard | 250—83.3 |
| 3,270,205 | 8/1966 | Ladd et al. | 250—83.3 |
| 3,320,419 | 5/1967 | Thomas et al. | 250—83.3 |

RALPH G. NILSON, Primary Examiner

M. J. FROME, Assistant Examiner

U.S. Cl. X.R.

235—72, 151.3; 250—71.5